(12) United States Patent
Nakano

(10) Patent No.: US 8,743,672 B2
(45) Date of Patent: Jun. 3, 2014

(54) OPTICAL DISK MANUFACTURING APPARATUS AND OPTICAL DISK MANUFACTURING METHOD

(75) Inventor: Syouji Nakano, Okayama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/817,133

(22) PCT Filed: Jul. 23, 2012

(86) PCT No.: PCT/JP2012/004665
§ 371 (c)(1),
(2), (4) Date: Feb. 14, 2013

(87) PCT Pub. No.: WO2013/021557
PCT Pub. Date: Feb. 14, 2013

(65) Prior Publication Data
US 2013/0147073 A1 Jun. 13, 2013

(30) Foreign Application Priority Data

Aug. 8, 2011 (JP) .................................. 2011-172777

(51) Int. Cl.
*G11B 7/20* (2006.01)
(52) U.S. Cl.
USPC .............................. 369/94; 264/1.37; 425/150
(58) Field of Classification Search
USPC .............................. 369/94; 264/1.37; 425/150
See application file for complete search history.

(56) References Cited

U.S. PATENT DOCUMENTS

| | | | |
|---|---|---|---|
| 7,061,850 B1 * | 6/2006 | Irie et al. ..................... | 369/59.24 |
| 8,031,582 B2 * | 10/2011 | Ohkubo ...................... | 369/275.3 |
| 8,335,149 B2 * | 12/2012 | Nakane ....................... | 369/124.07 |
| 2007/0263525 A1 * | 11/2007 | Ohkubo ....................... | 369/275.2 |
| 2011/0051589 A1 * | 3/2011 | Kataoka et al. ........... | 369/112.23 |

FOREIGN PATENT DOCUMENTS

| | | | | |
|---|---|---|---|---|
| JP | 2004005982 A | * | 1/2004 | |
| JP | 2005-196942 A | | 7/2005 | |
| JP | 2007-073122 A | | 3/2007 | |
| JP | 2007-220169 A | | 8/2007 | |
| JP | 2007220169 A | * | 8/2007 | |
| JP | 2009-129505 A | | 6/2009 | |
| JP | 2009-157958 A | | 7/2009 | |

OTHER PUBLICATIONS

International Search Report of PCT Application No. PCT/JP2012/004665.

* cited by examiner

*Primary Examiner* — Brenda Bernardi
(74) *Attorney, Agent, or Firm* — Shinjyu Global IP

(57) ABSTRACT

In an optical disk manufacturing apparatus, a movement mechanism changes the movement speed of a laser beam irradiation component from a first to a second speed at a first radial position located within where the laser beam irradiation component moves from an inner peripheral region of the optical disk to an identification information recording region of the optical disk, and changes the movement speed from the second to a third speed at a second radial position at which the laser beam irradiation component has reached the identification information recording region at the second speed. The second speed is lower than the first speed and the third speed. The laser beam irradiation component records the identification information by irradiating with a laser beam while alternating between a first power level and a second power level low enough not to crystallize the recording layer, when moving through the identification information recording region.

14 Claims, 9 Drawing Sheets

OPTICAL DISK MANUFACTURING APPARATUS AND OPTICAL DISK MANUFACTURING METHOD

TECHNICAL FIELD

The present invention relates to the manufacture of an optical disk, and more particularly relates to an optical disk manufacturing apparatus and an optical disk manufacturing method with which the recording layer of an optical disk is initialized by irradiation with a laser beam, and identification information about the optical disk is recorded.

BACKGROUND

In the past, data in the form of a barcode was recorded in a BCA (burst cutting area) in the innermost peripheral part of an optical disk in order to prevent the illegal copying of the optical disk. This barcode data included a serial number, an identification number, or other such individual information, and this information was used to manage optical disks and prevent their illegal copying.

The BCA code (barcode data) is made up of a plurality of bars arranged with varying spacing and includes data generated by converting BCA data by means of specific data conversion. BCA data is the original data of the BCA code, and is individual information consisting of a serial number, an identification number, or the like.

In the process of manufacturing a phase-change optical disk that differentiates data in a crystalline state on a recording surface, the optical disk undergoes sputtering or the like, after which the recording surface becomes amorphous, which is a form with low reflectivity. Therefore, a step is necessary to crystallize the recording layer (hereinafter also referred to as initialization) in order to make it possible for data to be recorded. Also, a BCA code is recorded at the stage of manufacturing the optical disk. In view of this, it has been proposed that the optical disk initialization step be performed continuously with the recording of the BCA code. For example, a BCA code is recorded by irradiating a specific radial region with a laser beam in a pulse pattern to produce initialized sites (high reflectivity sites) and non-initialized sites (low reflectivity sites), and initialization is performed in the other radial region by irradiation with a laser beam of a specific intensity.

The recording of the BCA code is carried out as follows, for example. When the optical disk is rotated while moving the laser beam irradiation position in the radial direction, the elliptical beam spot directed at the optical disk moves in the radial direction and the peripheral direction of the optical disk. The parts of the optical disk where the laser beam intensity is high undergo initialization and take on a high reflectivity, while the parts where the laser beam intensity is low remain as bars with low reflectivity. The pulsed laser beam emission timing is controlled with respect to the rotation of the optical disk so that sites of high and low reflectivity in the peripheral direction are formed at the same radial positions. This allows bar-shaped BCA code to be recorded in a specific radial region of the optical disk.

Initialization is performed in the inner peripheral region of an optical disk adjacent to an inner periphery of the radial region in which the BCA code is recorded, and in the outer peripheral region that is adjacent to an outer periphery of the radial region in which the BCA code is recorded. Therefore, while the beam spot is moved from the inner peripheral side to the outer peripheral side of the optical disk, first the inner peripheral region adjacent to the radial region in which the BCA code is to be recorded is initialized, and then the BCA code is recorded in the radial region in which the BCA code is to be recorded, and then the outer peripheral region adjacent to the radial region in which the BCA code is recorded is initialized.

There is a known apparatus with which the radial positions of the inner peripheral end and the outer peripheral end of each BCA code are aligned in the peripheral direction in the recording of BCA code (Japanese Laid-Open Patent Application 2009-129505, for example).

SUMMARY

Technical Problem

This disclosure provides an optical disk manufacturing apparatus and optical disk manufacturing method that improves the yield in the manufacture of optical disks.

Solution to Problem

The optical disk manufacturing apparatus disclosed herein is for manufacturing a phase-change optical disk having at least one recording layer including an identification information recording region for recording identification information of the optical disk, an inner peripheral region disposed on the inside in a radial direction of the identification information recording region, and an outer peripheral region disposed on the outside in the radial direction of the identification information recording region. This apparatus comprises a laser beam irradiation component that directs a laser beam at the recording layer of the optical disk, a movement mechanism that moves the laser beam irradiation component in a radial direction of the optical disk, a rotation mechanism that rotates the optical disk, and a controller that controls the laser beam irradiation component, the movement mechanism, and the rotation mechanism. With this optical disk manufacturing apparatus, according to a command from the controller, the laser beam irradiation component irradiates the recording layer with a laser beam at a first power level required to crystallize the recording layer while the rotation mechanism rotates the optical disk. The movement mechanism (i) changes a movement speed of the laser beam irradiation component from a first speed to a second speed at a first radial position located within a range where the laser beam irradiation component moves from the inner peripheral region of the optical disk to the identification information recording region, and (ii) changes the movement speed of the laser beam irradiation component from the second speed to a third speed at a second radial position at which the laser beam irradiation component has reached the identification information recording region at the second speed. The second speed is set to be lower than the first speed and the third speed. The laser beam irradiation component records the identification information by irradiating with a laser beam while alternating between the first power level and a second power level that is low enough not to crystallize the recording layer, when moving through the identification information recording region.

Advantageous Effects

The optical disk manufacturing apparatus and manufacturing method disclosed herein improve the yield in the manufacture of optical disks.

DETAILED DESCRIPTION

Figure 1:
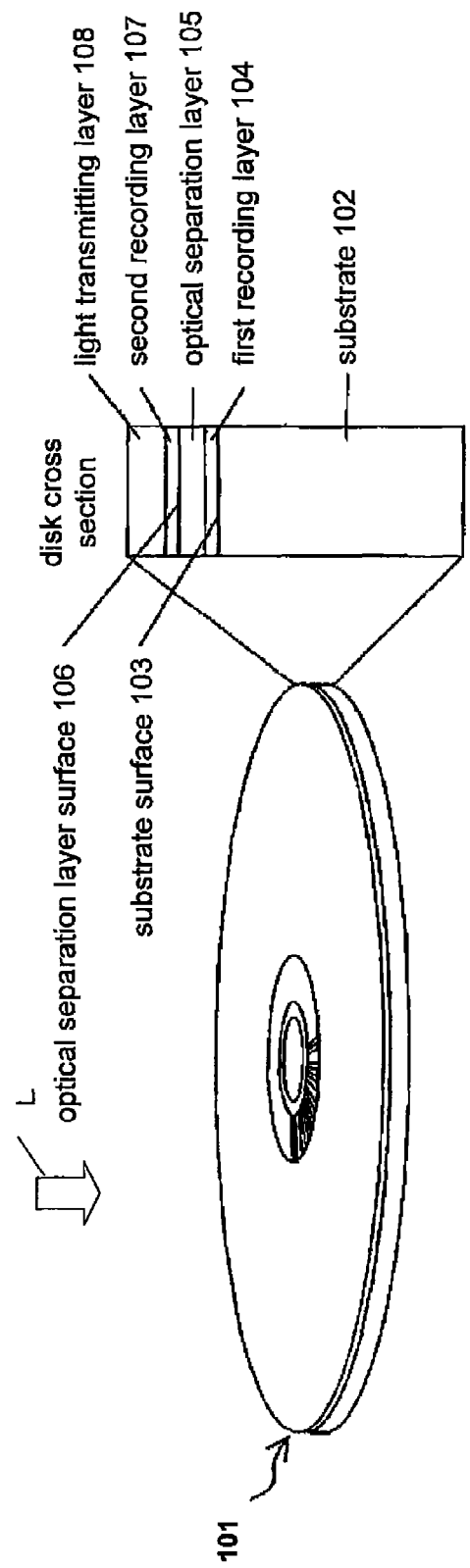
FIG. 1 is a simplified diagram of the configuration of the optical disk in Embodiment 1.

Selected embodiments will now be described in detail through reference to the drawings as needed. Unnecessarily detailed description may be omitted in some cases, however. For example, redundant description of components that are substantially the same, or the detailed description of matters that are well known may be omitted. This is to facilitate understanding on the part of a person skilled in the art by avoiding unnecessarily redundant descriptions below. It will be apparent to those skilled in the art from this disclosure that the following descriptions of the embodiments are provided for illustration only and not for the purpose of limiting the invention as defined by the appended claims and their equivalents.

It is the intention of the inventors to provide the appended drawings and the following description in order that a person skilled in the art might thoroughly understand the present disclosure, and not to limit the subject matters recited in the claims.

Embodiment 1

In the manufacture of an optical disk with a multilayer film structure a BCA code, in the form of a barcode that is identification information, is recorded simultaneously with the initialization of the optical disk. There is a conventional method in which the movement of a laser beam in the radial direction is temporarily halted in order to align the radial position of the end of the barcode-form BCA code in the peripheral direction. Here, if the BCA code is recorded by pulling in the focus to the innermost recording layer closest to the substrate, the laser beam will also pass through the front recording layer films that are farther away from the substrate, and part of the laser light will be absorbed as thermal energy by the recording layer films, generating heat. In the region where the laser beam stops, the number of passes of the laser beam increases, resulting in extended heating and a high temperature, so even the front recording layer films farther away from the substrate end up being initialized even though the focus is not on them. As a result, reflected light returns from both the inner side recording layer and the front side recording layer, and the focus error signal is disrupted, making focus control more difficult, and the beam tends to go out of focus. Consequently, the optical disk initialization step cannot be carried out properly, and this adversely affects the yield in the manufacture of optical disks.

This embodiment relates to an optical disk manufacturing apparatus and manufacturing method with which the yield is improved in the initialization step in the manufacture of optical disks, and particularly multilayer phase-change rewritable optical disks such as one-sided double-layer or one-sided triple-layer rewritable Blu-ray discs.

In the following, a one-sided double-layer rewritable optical disk will be used as an example to describe an optical disk initialization apparatus and initialization method in which this initialization is performed.

In this embodiment, initializing the optical disk refers to using laser beam irradiation to crystallize an amorphous (non-crystalline) recording layer at the manufacturing stage of the optical disk.

Embodiment 1 will now be described through reference to FIGS. 1 to 9.

1-1. Configuration 1-1-1. Configuration of Optical Disk

FIG. 1 is a simplified diagram of the configuration of an optical disk 101. The optical disk 101, for example, is a Blu-ray disc, and has a substrate 102, a substrate surface 103, a first recording layer 104, an optical separation layer 105, an optical separation layer surface 106, a second recording layer 107, and a light transmitting layer 108.

A laser beam is incident from the direction of the arrow L in FIG. 1. Therefore, in the following description the "upper" side in FIG. 1 will be referred to as the laser beam incident side.

The substrate 102 is composed of a resin board such as polycarbonate or PMMA, a glass board, or the like. The substrate surface 103 is covered with a continuous groove in a spiral or concentric form, or the like.

The first recording layer 104 is formed over (on the laser beam incident side of) the substrate 102 by sputtering, electron beam deposition, or another such method.

The optical separation layer 105 is formed over the first recording layer 104. The optical separation layer 105 is made of a material that is transparent to the wavelength of the laser beam that irradiates the first recording layer 104 to reproduce signals, and has the function of optically separating the first recording layer 104 and the second recording layer 107. The optical separation layer 105 is formed by a method in which a layer composed of a UV-setting resin or the like is formed by spin coating, a method in which a transparent film is bonded with a pressure-sensitive tape, a UV-setting resin, or the like, or another such method. The optical separation layer surface 106 is covered with a continuous groove in a spiral or concentric form, or the like.

The second recording layer 107 is formed over the optical separation layer 105 by sputtering, electron beam deposition, or another such method.

The light transmitting layer 108 is formed over the second recording layer 107. The light transmitting layer 108 is formed by a method in which a layer composed of a UV-setting resin or the like is formed by spin coating, a method in which a transparent film is bonded over the second recording layer 107 with a pressure-sensitive tape, a UV-setting resin, or the like, or another such method.

Figure 2:
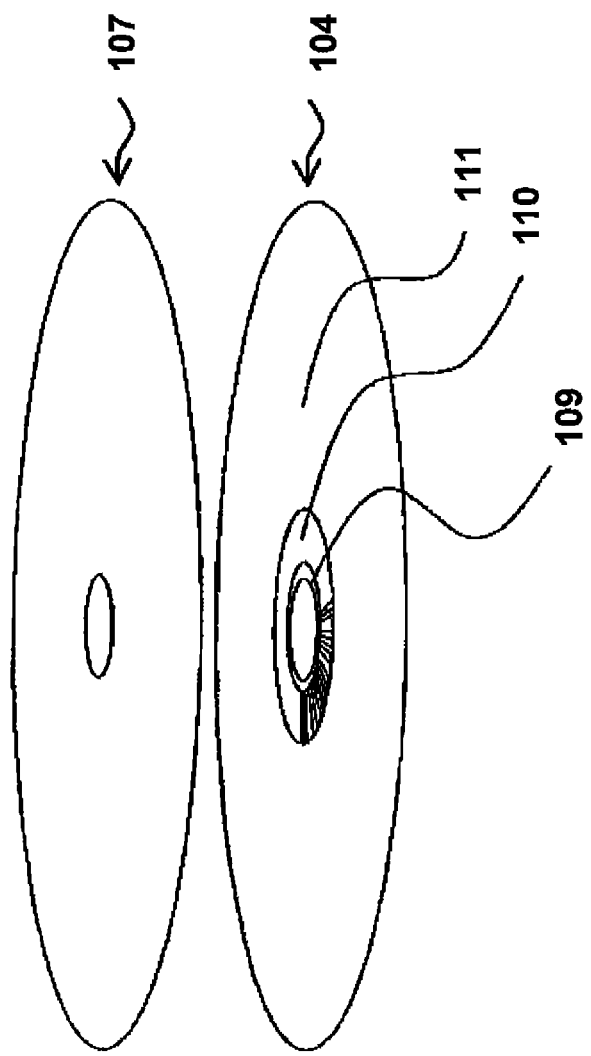
FIG. 2 is a simplified diagram of the configuration of the recording layer of the optical disk.

FIG. 2 is an exploded diagram of the first recording layer 104 and the second recording layer 107 of the optical disk 101 in FIG. 1. As shown in this drawing, a BCA (burst cutting area) used to identify each individual disk is provided to the optical disk 101. This BCA (an example of an identification information recording region) is formed in the initialization step, which is part of the process of manufacturing a phase-change rewritable disk. More specifically, while a laser beam is moved in the peripheral direction of the optical disk, the beam is switched on and off to form initialized parts and non-initialized parts in the form of a band in the radial direction, thereby forming a barcode-form BCA code (an example of identification information). This BCA is provided on the innermost periphery of the first recording layer 104, which is to the back when viewed from the laser beam incident side. Out of the entire initialized region, an inner peripheral initialized region 109 (an example of an inner peripheral region) is provided on the inner peripheral side from the BCA 110, and an outer peripheral initialized region 111 (an example of an outer peripheral region) that includes the entire data recording region is provided on the outer peripheral side from the BCA 110.

1-1-2. Configuration of Optical Disk Initialization Apparatus

Figure 3:
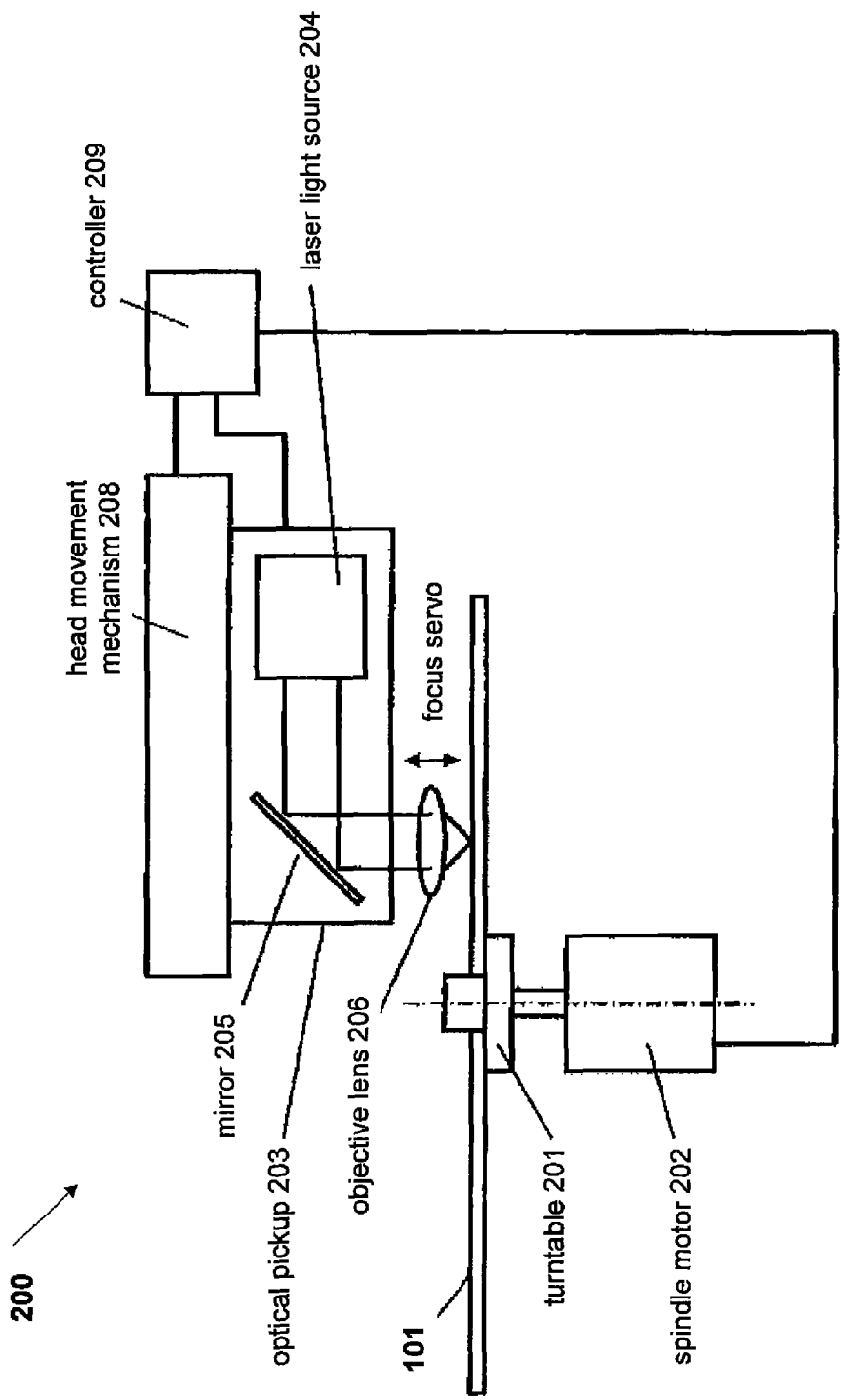
FIG. 3 is a simplified diagram of the overall configuration of an initialization apparatus for the optical disk.

FIG. 3 is a simplified diagram of the overall configuration of an optical disk initialization apparatus 200 (an example of an optical disk manufacturing apparatus) in this embodiment.

The optical disk initialization apparatus 200 initializes (crystallizes) the recording layer of a phase-change optical disk with a laser beam at a specific power level, and also records a barcode-form BCA code composed of initialized sites and non-initialized sites at a specific radial position of the optical disk. As shown in FIG. 3, the optical disk initialization apparatus 200 is made up of a turntable 201, a spindle motor 202 (an example of a rotation mechanism), an optical pickup 203 (an example of a laser beam irradiation component), a head movement mechanism 208 (an example of a movement mechanism), and a controller 209.

The turntable 201 is made from a metal material such as stainless steel, and supports the optical disk 101 with a vacuum chucking mechanism (not shown) or the like, so that the disk can rotate at high speed.

The spindle motor 202 is linked to the turntable 201. The spindle motor 202 rotates the optical disk 101 attached to the turntable 201 by a specific rotation control method on the basis of radial position information from the head movement mechanism 208. This rotation control method may involve, for example, a constant linear velocity (CLV) mode in which the rotational speed is controlled so that the peripheral direction relative movement speed between the laser beam and the optical disk 101 remains constant, or a constant angular velocity (CAV) mode in which the rotational speed remains constant even if the radial position of the head movement mechanism 208 changes.

The optical pickup 203 is constituted by a laser light source 204, a mirror 205, and an objective lens 206. The laser beam emitted from the laser light source 204 is focused on the first recording layer 104 or the second recording layer 107 of the optical disk 101 by the objective lens 206 using an astigmatic method, for example. Focus error signals obtained from the first recording layer 104 and the second recording layer 107 are used in focusing. A variety of methods can be employed for focus control, such as an astigmatic method or a knife edge method. A laser beam is shaped such that its light spot forms an elliptical shape. More specifically, the beam spot is disposed so as to achieve an elliptical shape in which the disk radial direction is the major axis direction and the peripheral direction is the minor axis direction. Doing this increases the initialization width in the radial direction per rotation of the disk, and boosts productivity.

The head movement mechanism 208 moves the optical pickup 203 in the radial direction using a pulse motor, a servo motor, a linear motor, or the like (not shown) as a drive source, and outputs radial position information to the controller 209. The movement speed of the optical pickup 203 is set as the amount of movement V of the optical pickup in the radial direction (μm/rotation) per disk rotation.

The controller 209 controls the rotational speed of the spindle motor 202, the movement rate of the head movement mechanism 208, the focusing of the optical pickup 203, initialization-use laser irradiation, BCA code recording-use laser irradiation, and so forth. The controller 209 is, for example, an integrated circuit or an apparatus including a processor and a memory, and is realized by a multipurpose DSP, FPGA, or the like that executes programs stored in a memory.

1-1-3. Configuration of First Recording Layer

Figure 4:
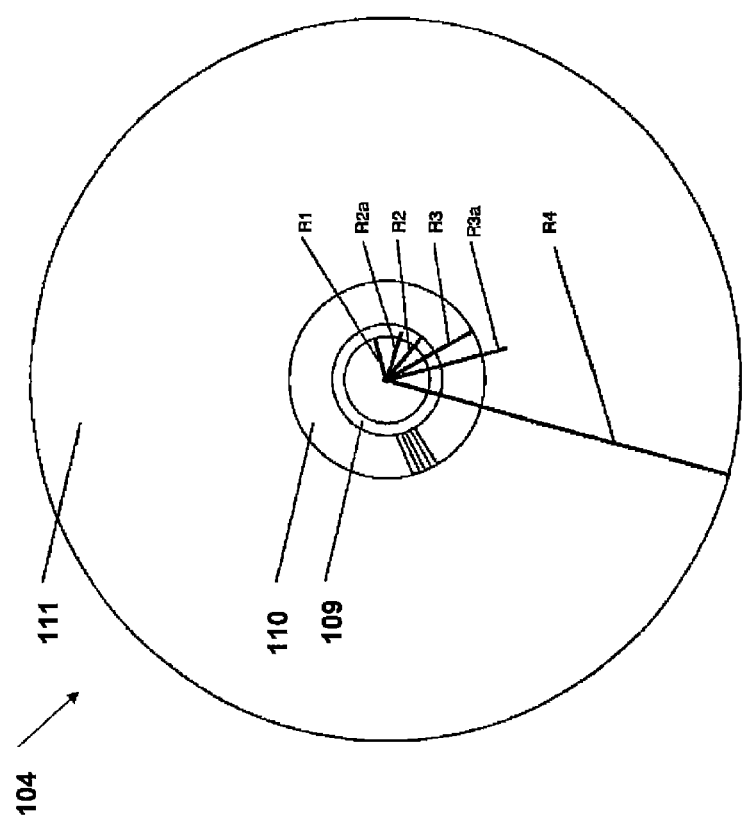
FIG. 4 is a simplified plan view of a first recording layer of the optical disk.

FIG. 4 is a plan view of the first recording layer 104 in this embodiment. R1, R2a, R2, R3, R3a, and R4 indicate the distance (that is, the radial position) from the center of the first recording layer 104, which is related to the movement speed of the optical pickup 203 in the radial direction in the initialization step (hereinafter referred to as the movement rate). R1 indicates the distance from the center of the first recording layer 104 to the inner end of the inner peripheral initialized region 109, and show the initialization start position. R2 indicates the distance from the center of the first recording layer 104 to the outer end of the inner peripheral initialized region 109 (that is, the inner end of the BCA 110), and shows the BCA code recording start position. R3 indicates the distance from the center of the first recording layer 104 to the outer end of the BCA 110, and shows the BCA code recording end position. R4 indicates the distance from the center of the first recording layer 104 to the outer side of the outer peripheral initialized region 111, and shows the initialization end position.

R2a indicates the distance from the center of the first recording layer 104 to a position slightly to the inside of the outer end of the inner peripheral initialized region 109. R2a is a position before the start of the BCA code recording, at which the movement rate of the optical pickup 203 is changed from the initialization-use movement rate to a decelerated movement rate, (that is, a decelerated movement start position before the start of BCA code recording). The position of R2a is set such that the optical disk 101 will rotate at least one rotation while the optical pickup 203 moves at a decelerated movement rate Vs (discussed below) between R2a and R2.

R3a indicates the distance from the center of the first recording layer 104 to a position slightly beyond the outer side of the BCA 110. R3a is a decelerated movement end position after the end of BCA code recording, that is, the position at which the decelerated movement is ended and the speed is changed to the initialization-use movement rate after the movement rate of the optical pickup 203 has been changed from the BCA code recording-use movement rate to the decelerated movement rate at the BCA code recording end position R3 where the BCA code recording ends. The position of R3a is set such that the optical disk 101 will rotate at least one rotation while the optical pickup 203 moves at the decelerated movement rate Vs between R3 and R3a.

1-1-4. Movement Rate of Optical Pickup

Figure 5:
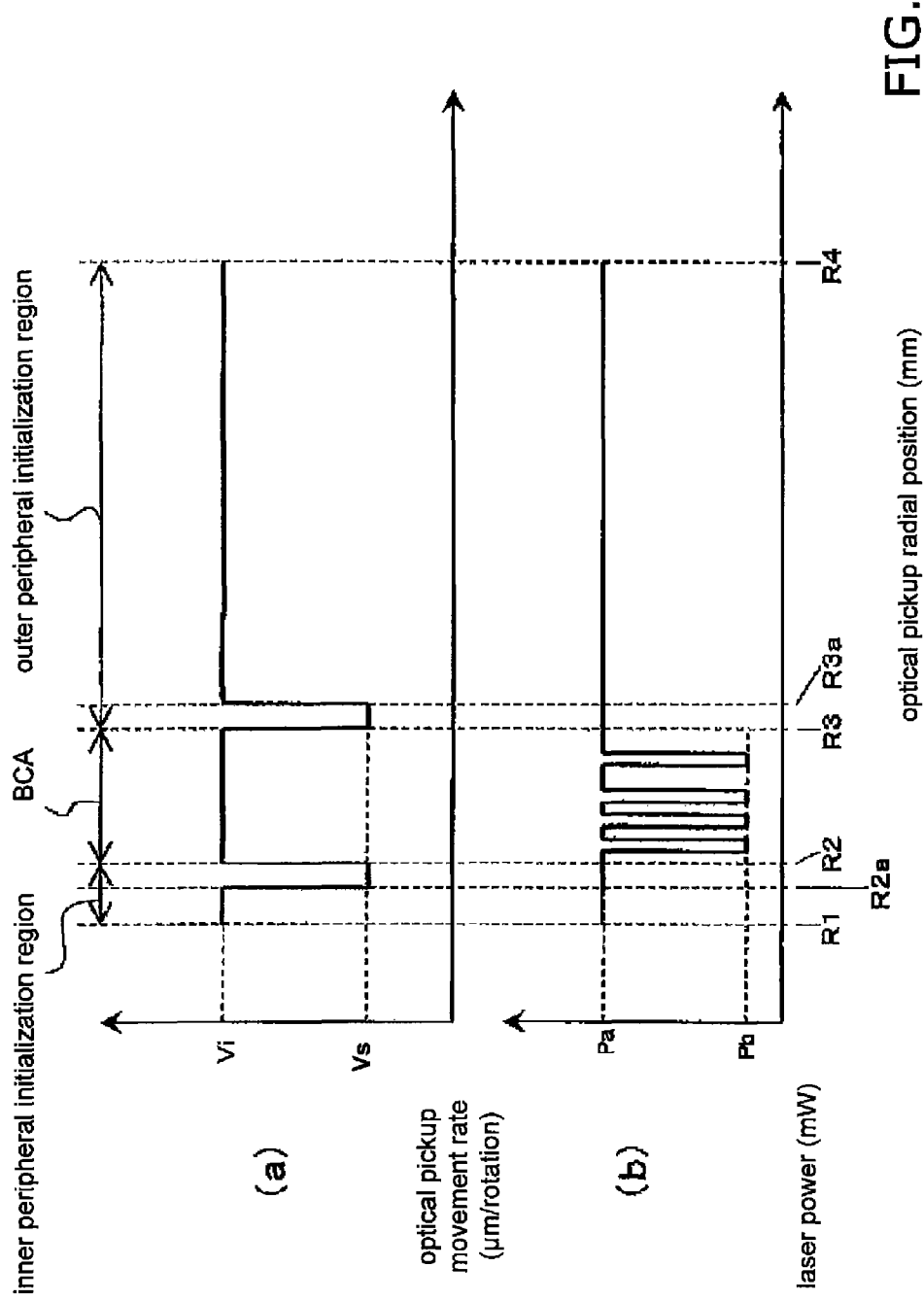
FIG. 5 is a graph of the laser power and the optical pickup movement rate with respect to the laser beam radial position when the first recording layer of this optical disk is initialized.

FIG. 5 is a graph of the movement rate of the optical pickup 202 (FIG. 5a) and the laser power (FIG. 5b) with respect to the laser beam radial position when the first recording layer 104 is initialized. In this graph, actually a specific acceleration/deceleration time is necessary to change speed, but to simplify the description, the acceleration/deceleration time in changing the movement rate of the optical pickup 203 is just given as zero.

As shown in FIG. 5a, the movement rate of the optical pickup 203 is set as follows.

(1) From the initialization start position R1 to the decelerated movement start position R2a (an example of a first radial position), an initialization-use movement rate Vi (an example of a first speed) is set.

(2) From the decelerated movement start position R2a to the BCA code recording start position R2 (an example of a second radial position), the decelerated movement rate Vs (>0 µm/rotation) (an example of a second speed) is set. The decelerated movement rate Vs is set such that the optical disk 101 will rotate at least one rotation while the optical pickup 203 moves at the decelerated movement rate Vs between R2a and R2.

(3) From the BCA code recording start position R2 to the BCA code recording end position R3 (an example of a third radial position), a BCA code recording-use movement rate is set. In this embodiment, the BCA code recording-use movement rate is set to equal the initialization-use movement rate Vi (an example of a third speed).

(4) From the BCA code recording end position R3 to the decelerated movement end position R3a (an example of a fourth radial position), the decelerated movement rate Vs (an example of a fourth speed) is set. The decelerated movement rate Vs is set such that the optical disk 101 will rotate at least one rotation while the optical pickup 203 moves at the decelerated movement rate Vs between R3 and R3a.

(5) From the decelerated movement end position R3a to the initialization end position R4, the initialization-use movement rate Vi (an example of a fifth speed) is set.

1-1-5. Laser Power

As shown in FIG. 5b, the laser power is set as follows.

(1) In the inner peripheral initialization region from the initialization start position R1 to the BCA code recording start position R2, and in the outer peripheral initialization region from the BCA code recording end position R3 to the initialization end position R4, an initialization-use laser power Pa (an example of a first power level) is set.

(2) From the BCA code recording start position R2 to the BCA code recording end position R3, pulse irradiation is performed for BCA code recording. Pb is the laser power for the portion of BCA code that will not be initialized (an example of a second power level), and is set to the optimal value according to the disk recording sensitivity and so forth.

1-2. Operation 1-2-1. Operation in Initialization Step

Figure 6A:
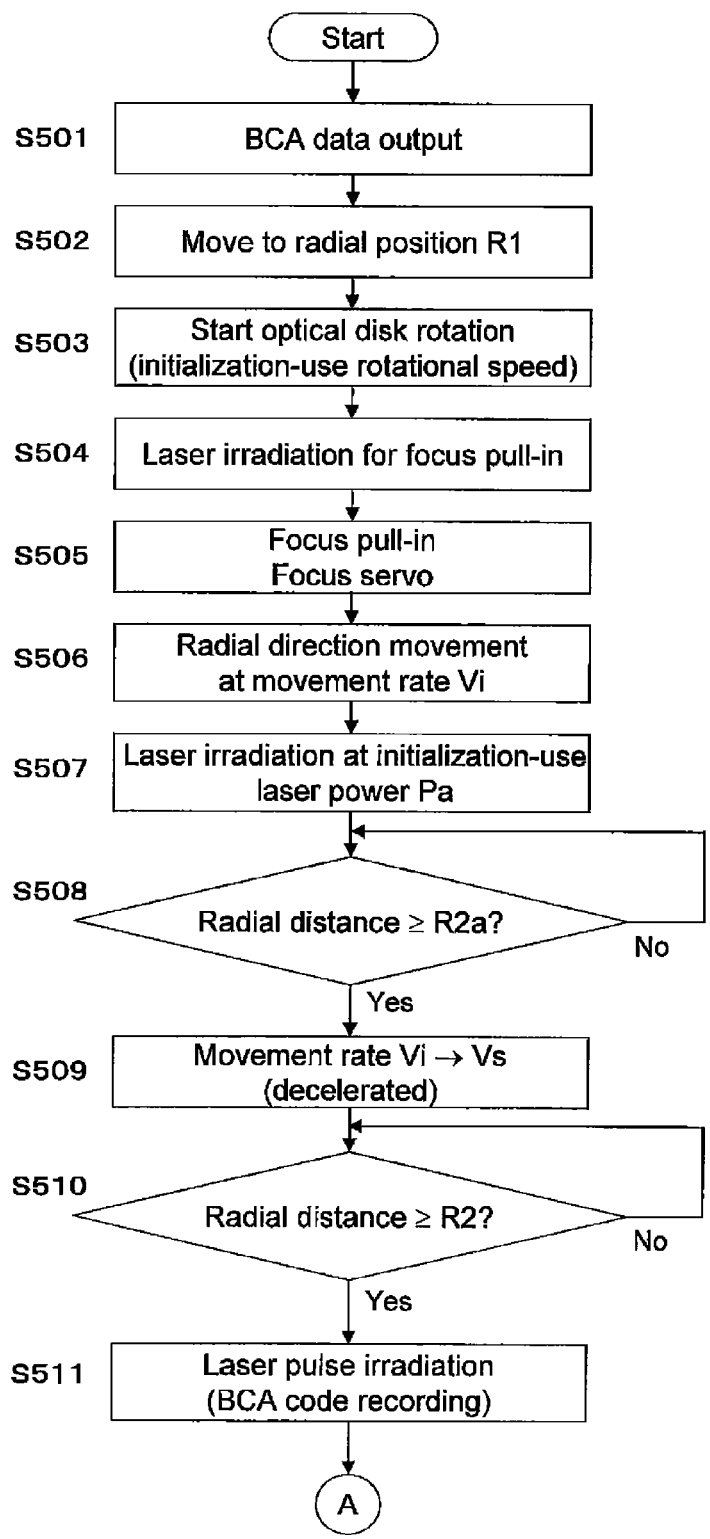
FIG. 6A is a flowchart illustrating the optical disk initialization steps in Embodiment 1.
Figure 6B:
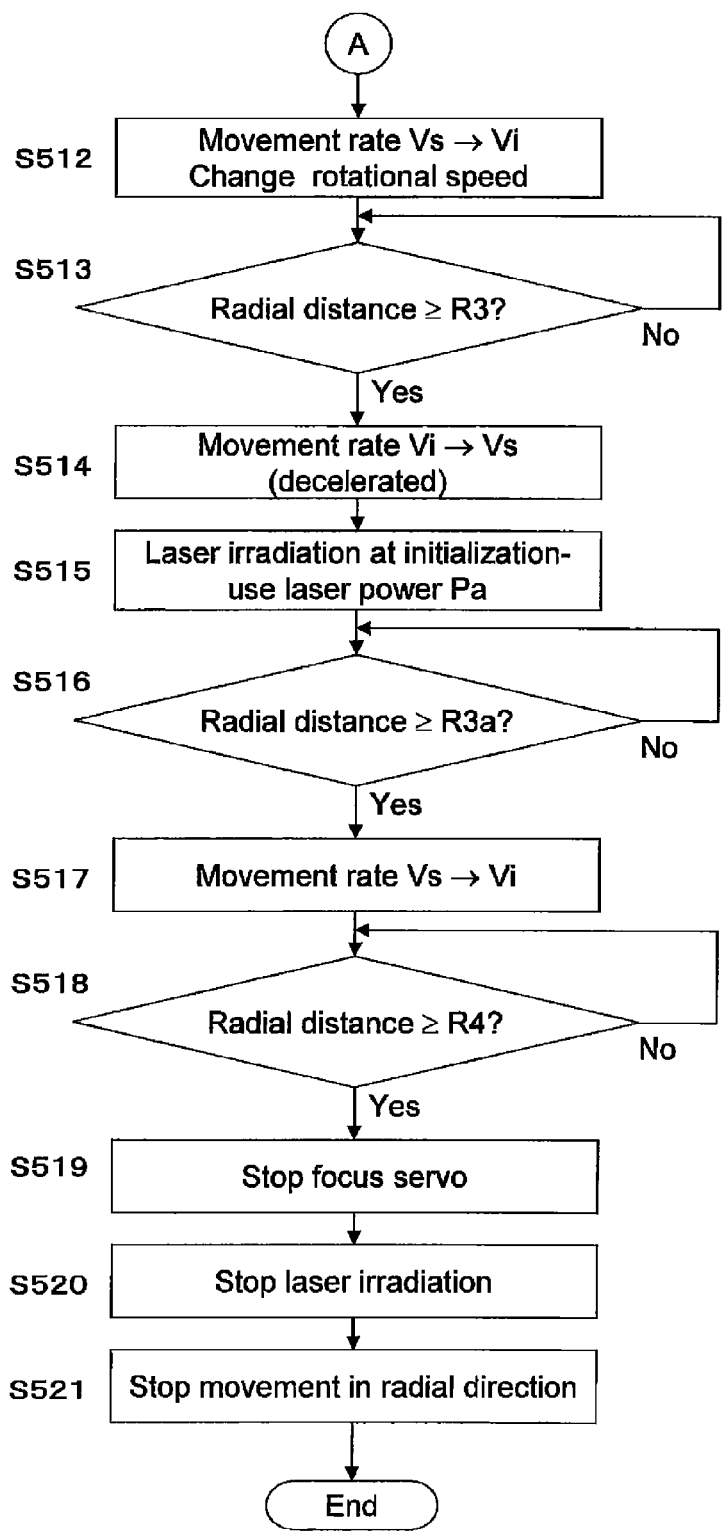
FIG. 6B is a flowchart illustrating the optical disk initialization steps in Embodiment 1.

FIGS. 6A and 6B are flowcharts of the initialization operation of the optical disk initialization apparatus 200 in this embodiment. This same initialization operation step is performed to initialize the first recording layer 104.

Step S501: First, BCA data is outputted from an external BCA code production-use computer terminal (such as a personal computer; not shown) or the like to the controller 209. The controller 209 performs data conversion (encoding) and produces a BCA data recording signal.

Step S502: Next, the head movement mechanism 208 is driven at a command from the controller 209, and the optical pickup 203 is moved to the initialization start position R1.

Step S503: The spindle motor 202 is then rotated at the initialization-use rotational speed at a command from the controller 209.

Step S504: The controller 209 sets the laser power to a focus pull-in power level, and drives the laser light source 204 to start laser beam irradiation.

Step S505: Focus pull-in to the first recording layer 104 is commenced. If focus pull-in is successful, the focus servo is started, and continues until initialization ends.

Step S506: Next, the radial movement rate of the optical pickup 203 is set to the initialization-use movement rate Vi and movement is commenced at a command from the controller 209.

Step S507: While the optical pickup 203 moves at the movement rate Vi, the laser power is set to the initialization-use laser power Pa, and laser irradiation is performed.

Step S508: Then, the controller 209 determines whether or not the radial position of the optical pickup 203 has reached the decelerated movement start position R2a.

Step S509: If it was determined in step S508 that the radial position of the optical pickup 203 has reached the decelerated movement start position R2a, the controller 209 changes the movement rate of the optical pickup 203 to the decelerated movement rate Vs. The position of R2a is set such that the optical disk 101 will rotate at least one rotation while the optical pickup 203 moves at the decelerated movement rate Vs between R2a and R2.

Step S510: Next, the controller 209 determines whether or not the radial position of the optical pickup 203 has reached the BCA code recording start position R2.

Step S511: If it was determined in step S510 that the radial position of the optical pickup 203 has reached the BCA code recording start position R2, the controller 209 changes the laser irradiation power to the BCA code recording-use power level (that is, pulse irradiation).

Step S512: At the same time, the controller 209 changes the movement rate of the optical pickup 203 to the BCA recording-use movement rate, and the spindle rotational speed to the BCA recording-use rotational speed.

Step S513: Next, the controller 209 determines whether or not the radial position of the optical pickup 203 has reached the BCA code recording end position R3.

Step S514: If it was determined in step S513 that the radial position of the optical pickup 203 has reached the BCA code recording end position R3, the controller 209 lowers the movement rate of the optical pickup 203 to the decelerated movement rate Vs.

Step S515: At the same time, the controller 209 changes the laser irradiation power to the initialization-use laser power Pa.

Step S516: Next, the controller 209 determines whether or not the radial position of the optical pickup 203 has reached the decelerated movement end position R3a.

Step S517: If it was determined in step S516 that the radial position of the optical pickup 203 has reached the decelerated movement end position R3a, the controller 209 changes the movement rate of the optical pickup 203 to the initialization-use movement rate Vi. The position of R3a is set such that the optical disk 101 will rotate at least one rotation while the optical pickup 203 moves at the decelerated movement rate Vs between R3 and R3a.

Step S518: Next, the controller 209 determines whether or not the radial position of the optical pickup 203 has reached the initialization end position R4.

Step S519: If it was determined in step S518 that the radial position of the optical pickup 203 has reached the initialization end position R4, the controller 209 halts the focus servo.

Step S520: At the same time, the controller 209 halts laser irradiation.

Step S521: The controller 209 halts the drive of the head movement mechanism 208 to halt the movement of the optical pickup 203 in the radial direction.

The initialization of the first recording layer 104 is carried out by the above series of operations. After these initialization steps, the controller 209 drives the optical pickup 203 to the innermost periphery, and initializes the second recording layer 107 by the same procedure as that for the first recording layer 104. No BCA is provided to the second recording layer 107. Therefore, the initialization steps are carried out at the laser power, spindle rotational speed, and radial movement rate set for the initialization of the entire region from the second recording layer initialization start position to the second recording layer initialization end position.

The above step concludes the initialization and the BCA recording to a specific radial position of a one-sided, double-layer rewritable optical disk.

1-2-2. Effect of Initialization

Figure 7:
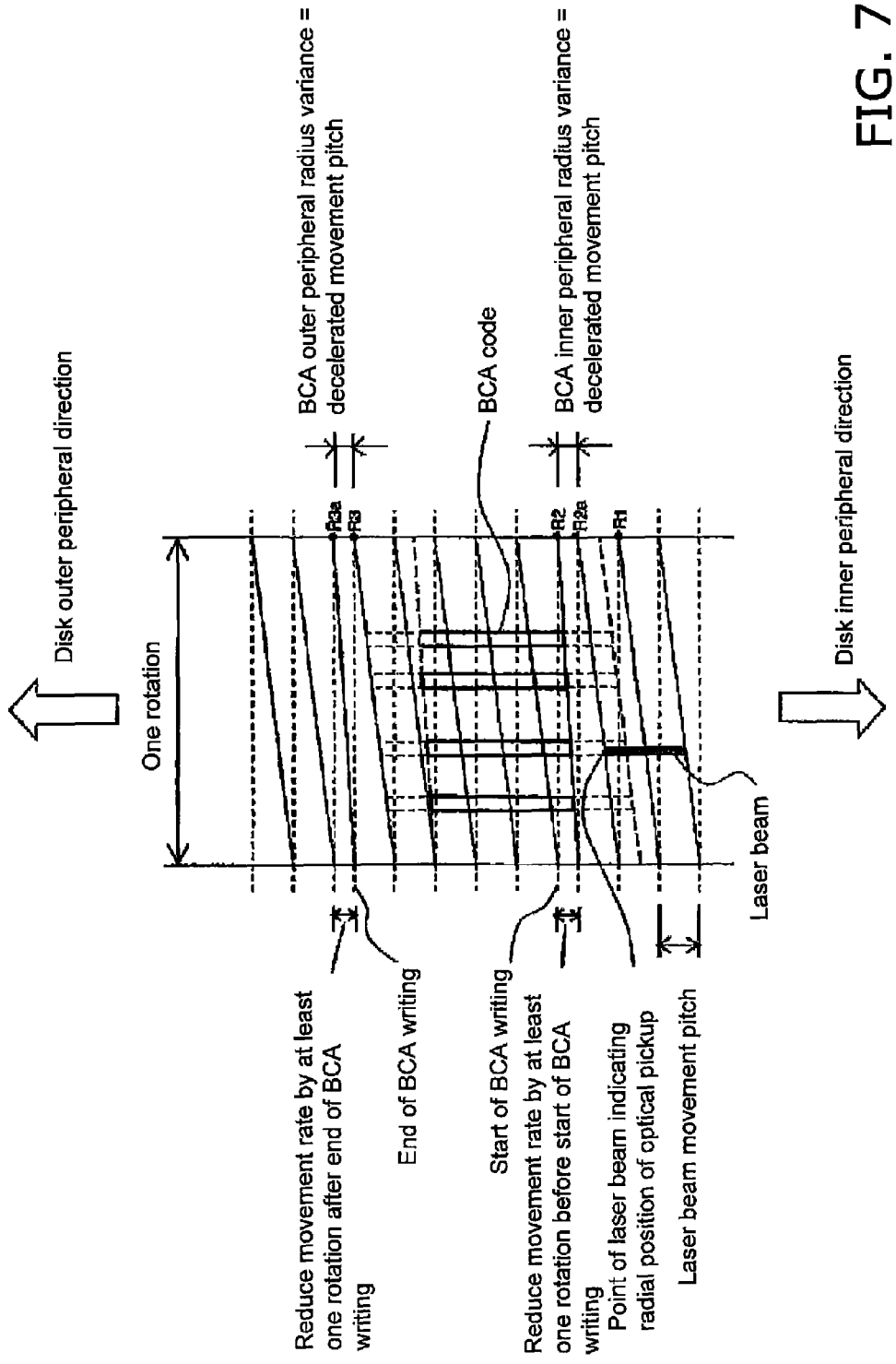
FIG. 7 is a diagram of the recording state at the boundary between the BCA code recording region and the initialization region of the optical disk in Embodiment 1.

FIG. 7 is a diagram of the recording state at the boundary between the BCA code recording region and the initialization region of the optical disk produced by the initialization in this embodiment. In this drawing, the peripheral direction of the disk that has undergone initialization and BCA recording in this embodiment is indicated by straight lines, and the radial direction scale is enlarged.

In this embodiment, the radial direction movement rate of the optical pickup 203 for initialization was set to Vi (μm/rotation), and the decelerated movement rate of the optical pickup 203 before and after BCA code writing was set to Vs (μm/rotation). Thus reducing the radial direction movement rate of the optical pickup by at least one rotation before and after BCA code writing makes it possible to reduce variance in the radial position of the inner peripheral end and outer peripheral end of the BCA code to within the decelerated movement pitch Vs (μm). For example, the laser wavelength is set to 150 μm, Vi to 75 μm/rotation, and Vs to 10 μm/rotation. Variance in the radial position at the inner peripheral end and outer peripheral end of the BCA code reaches a maximum of 75 μm when there is no deceleration, but can be reduced to 10 μm when there is deceleration, and is easily kept within the rated allowable range (such as ±60 μm with a DVD).

Figure 8:
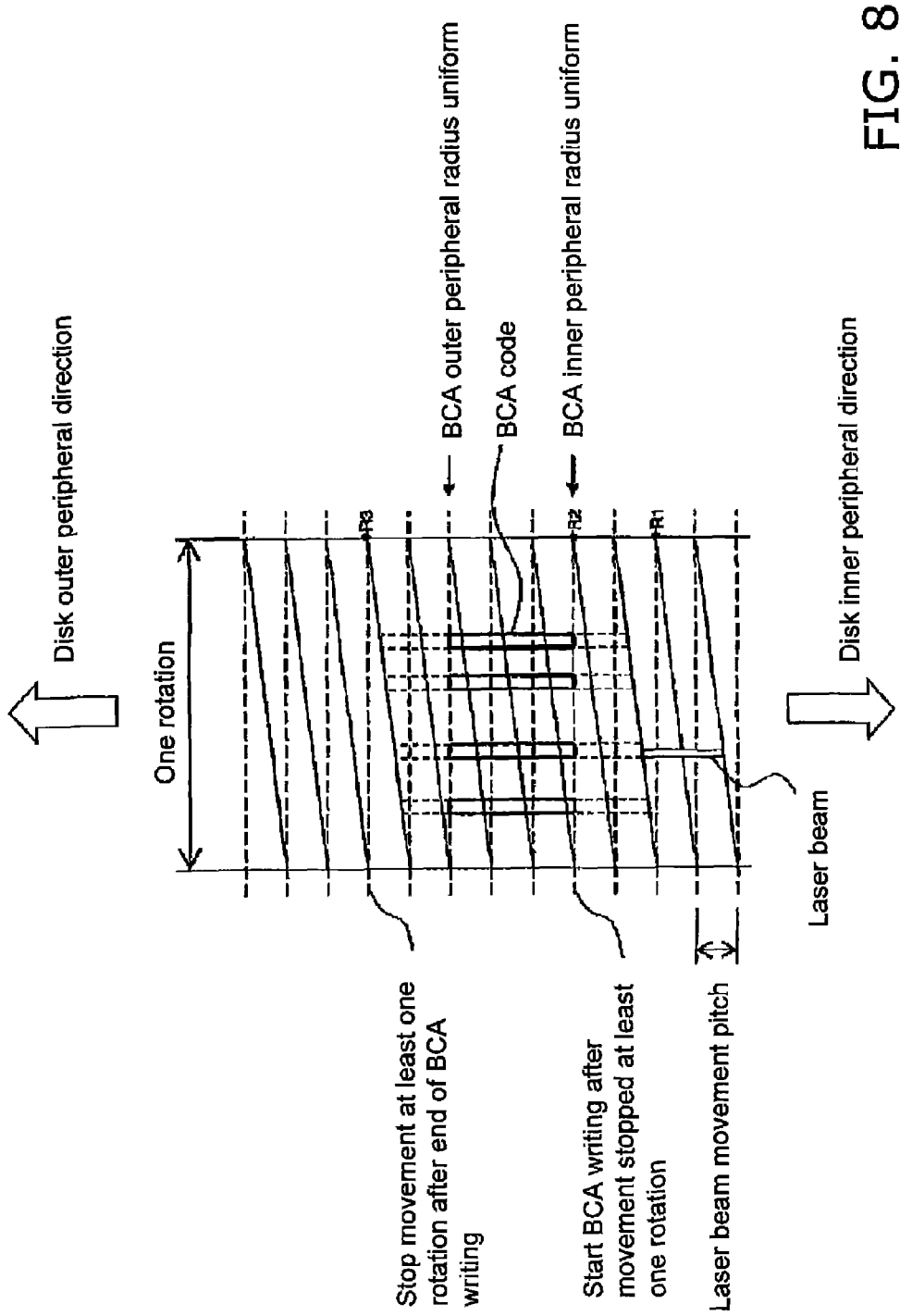
FIG. 8 is a diagram of the recording state at the boundary between the BCA code recording region and the initialization region of the optical disk in a comparative example.

FIG. 8, like FIG. 7, is a diagram of the recording state at the boundary between the BCA code recording region and the initialization region of the optical disk, but in a comparative example. In this comparative example, the movement of the optical pickup is stopped at the inner peripheral end and outer peripheral end of the BCA code. This stoppage makes it possible to eliminate variance in the radial position of the BCA code. Nevertheless, with a multilayer optical disk, stopping the optical pickup results in a longer irradiation time onto the second recording layer, which is in front as seen from the laser incident side. Therefore, even though no focusing has been performed on the second recording layer, the amount of laser beam heat absorbed by the second recording layer increases, and the second recording layer 107 ends up being initialized along with the first recording layer 104. As a result, the reflectivity of the second recording layer 107 gets higher, and reflected light returns from both the first recording layer 104 and the second recording layer 107, so the focus error signal used for the focus servo is disrupted, and the focus tends to be lost.

1-3. Effects, Etc.

In this embodiment, the optical disk initialization apparatus 200, which initializes the phase-change optical disk 101 having at least one recording layer that includes the BCA 110 in which identification information for the optical disk is recorded, the inner peripheral initialized region 109 disposed to the inside in the radial direction of the BCA 110, and the outer peripheral initialized region 111 disposed to the outside in the radial direction of the BCA 110, comprises the optical pickup 203 for directing a laser beam at the first recording layer 104 and the second recording layer 107 of the optical disk 101, the head movement mechanism 208 for moving the optical pickup 203 in the radial direction of the optical disk 101, the spindle motor 202 for rotating the optical disk 101, and the controller 209 for controlling the optical pickup 203, the head movement mechanism 208, and the spindle motor 202. With this optical disk initialization apparatus 200, these recording layers are irradiated with a laser beam at a power level Pa required to crystallize the first recording layer 104, with the optical pickup 203, while the optical disk 101 is rotated by the spindle motor 202, at a command from the controller 209. The head movement mechanism 208 (i) lowers the movement rate of the optical pickup 203 from Vi to Vs at the radial position R2a located in a range where the optical pickup 203 is moving from the inner peripheral initialized region 109 of the optical disk 101 to the BCA 110, and (ii) returns the movement rate of the optical pickup 203 from Vs to Vi at the radial position R2 at which the optical pickup 203 has reached the BCA 110 at Vs. The optical pickup 203 records the BCA code by emitting the laser beam while alternately switching between the laser power Pa and a laser power Pb that is low enough not to crystallize the first recording layer 104, when moving through the BCA 110.

With this embodiment, since the movement rate of the optical pickup 203 is reduced over a specific interval before and after the BCA 110, the amount of heat absorbed by the second recording layer 107 can be reduced as compared to when the optical pickup 203 is completely stopped. That is, by suitably setting the movement rate of the optical pickup 203 before and after the BCA 110, variance in the radial position of the BCA code can be kept within the allowable range, and at the same time, defocusing during production can be prevented, thus solving both problems at once.

This embodiment can be applied not only to an optical disk manufacturing apparatus, but also to an optical disk manufacturing method.

Other Embodiments

An embodiment was described above as an example of the technology disclosed herein. The appended drawings and a detailed description were provided for this purpose.

Therefore, the constituent elements shown in the appended drawings and mentioned in the detailed description can include not only those constituent elements that are essential to solving the problem, but also constituent elements that are not essential to solving the problem. Accordingly, just because constituent elements that are not essential to solving the problem are shown in the appended drawings and mentioned in the detailed description, it should not immediately be concluded that those non-essential constituent elements are essential constituent elements.

For example, in the above embodiment a one-sided double-layer rewritable optical disk was used as an example, but the above embodiment can also be applied to an optical disk having a single recording layer, or an optical disk having three or more recording layers.

Also, the BCA code in the above embodiment is just an example, and may be some other kind of identification information. Nor is the BCA limited to being formed on the first recording layer that is farthest away from the laser beam incident side, and may instead be formed on the nearest recording layer, or may be formed on a recording layer located in the middle between a plurality of recording layers.

Also, in the above embodiment, the initialization-use movement rate Vi that is applied between the initialization start position R1 and the decelerated movement start position R2a, the BCA cord recording movement rate Vi that is applied between the BCA code recording start position R2 and the BCA code recording end position R3, and the initialization-use movement rate Vi that is applied between the decelerated movement end position R3a and the initialization end position R4 were all set to the same speed, but may instead be set to different speeds. Also, the decelerated movement rate Vs that is applied between the decelerated movement start position R2a and the BCA code recording start position R2, and the decelerated movement rate Vs that is applied between the BCA code recording end position R3 and the decelerated movement end position R3a need not be set to the same speed. Specifically, as long as the relation Vi>Vs holds true, then the speeds may differ from one another.

The above embodiments are given as examples of the technology disclosed herein, and therefore can undergo various modifications, substitutions, additions, eliminations, and so forth within the scope of the patent claims or their equivalents.

INDUSTRIAL APPLICABILITY

This technology is useful as an optical disk manufacturing apparatus, and particularly as an optical disk initialization apparatus.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the optical disk manufacturing apparatus and optical disk manufacturing method. Accordingly, these terms, as utilized to describe the technology disclosed herein should be interpreted relative to optical disk manufacturing apparatus and optical disk manufacturing method.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. An optical disk manufacturing apparatus for manufacturing a phase-change optical disk having at least one recording layer including an identification information recording region for recording identification information of the optical disk, an inner peripheral region disposed on the inside in a radial direction of the identification information recording region, and an outer peripheral region disposed on the outside in the radial direction of the identification information recording region, said apparatus comprising:
    a laser beam irradiation component that directs a laser beam at the at least one recording layer of the optical disk;
    a movement mechanism that moves the laser beam irradiation component in a radial direction of the optical disk;
    a rotation mechanism that rotates the optical disk; and
    a controller that controls the laser beam irradiation component, the movement mechanism, and the rotation mechanism;
    wherein, according to a command from the controller,
        the laser beam irradiation component irradiates the recording layer with a laser beam at a first power level, required to crystallize the recording layer, while the rotation mechanism is rotating the optical disk;
        the movement mechanism (i) changes a movement speed of the laser beam irradiation component from a first speed to a second speed at a first radial position located within a range where the laser beam irradiation component moves from the inner peripheral region of the optical disk to the identification information recording region, and (ii) changes the movement speed of the laser beam irradiation component from the second speed to a third speed at a second radial position at which the laser beam irradiation component has reached the identification information recording region at the second speed,
        the second speed is set to be lower than the first speed and the third speed, and the laser beam irradiation component records the identification information by irradiating with a laser beam while alternating between the first power level and a second power level that is low enough not to crystallize the recording layer, when moving through the identification information recording region,
        the movement mechanism (i) changes the movement speed of the laser beam irradiation component from the third speed to a fourth speed at a third radial position at which the laser beam irradiation component has moved from the identification information recording region to the outer peripheral region, and (ii) changes the movement speed of the laser beam irradiation component from the fourth speed to a fifth speed at a fourth radial position located within a range where the laser beam irradiation component moves through the outer peripheral region at the fourth speed, and
        the fourth speed is set to be lower than the first speed, the third speed, and the fifth speed.

2. The optical disk manufacturing apparatus according to claim 1,
wherein at least one of the fourth radial position and the fourth speed is set so that the rotation mechanism rotates the optical disk at least once while the laser beam irradiation component moves from the third radial position to the fourth radial position at the fourth speed.

3. The optical disk manufacturing apparatus according to claim 1, wherein:
the optical disk has a plurality of recording layers, and
the laser beam irradiation component records the identification information to a first recording layer out of all the plurality of recording layers, the first recording layer being located the farthest away from a laser beam irradiation side of the optical disk.

4. The optical disk manufacturing apparatus according to claim 1, wherein:
the first speed, the third speed, and the fifth speed are set to the same speed, and
the second speed and the fourth speed are set to the same speed.

5. The optical disk manufacturing apparatus according to claim 1, wherein:
the controller:
irradiates an inner end of the inner peripheral region of the optical disk with a laser beam from the laser beam irradiation component at a third power level for focus pull-in,
starts a focus servo after the focus pull-in, and
starts irradiation of the inner peripheral region by the laser beam irradiation component with a laser beam at the first power level while operating the focus servo.

6. An optical disk manufacturing method for manufacturing a phase-change optical disk having at least one recording layer including an identification information recording region for recording identification information of the optical disk, an inner peripheral region disposed on the inside in a radial direction of the identification information recording region, and an outer peripheral region disposed on the outside in the radial direction of the identification information recording region, said method comprising:
irradiating the recording layer with a laser beam at a first power level required to crystallize the recording layer while rotating the optical disk with a rotation mechanism;
moving the laser beam with a movement mechanism in a radial direction of the optical disk;
changing a movement speed of the laser beam from a first speed to a second speed that is lower than the first speed, at a first radial position located within a range where the movement mechanism moves the laser beam from the inner peripheral region of the optical disk to the identification information recording region;
changing the movement speed of the laser beam from the second speed to a third speed that is higher than the second speed at a second radial position at which the movement mechanism has moved the laser beam to the identification information recording region at the second speed;
changing the movement speed of the laser beam from the third speed to a fourth speed that is lower than the first speed and the third speed, at a third radial position at which the movement mechanism has moved the laser beam from the identification information recording region to the outer peripheral region;
changing the movement speed of the laser beam from the fourth speed to a fifth speed that is higher than the second speed and the fourth speed, at a fourth radial position while the movement mechanism moves the laser beam through the outer peripheral region at the fourth speed; and
recording the identification information by irradiating with a laser beam while alternating between the first power level and a second power level that is low enough not to crystallize the recording layer, when the laser beam is moved by the movement mechanism through the identification information recording region.

7. The optical disk manufacturing method according to claim 6, wherein:
the optical disk is rotated at least once by the rotation mechanism while the laser beam is moved by the movement mechanism from the third radial position to the fourth radial position at the fourth speed.

8. The optical disk manufacturing method according to claim 6, further comprising:
irradiating an inner end of the inner peripheral region of the optical disk with a laser beam at a third power level for focus pull-in;
starting a focus servo after the focus pull-in; and
starting irradiation of the inner peripheral region with a laser beam at the first power level while operating the focus servo.

9. The optical disk manufacturing apparatus according to claim 1, wherein:
at least one of the first radial position and the second speed is set so that the rotation mechanism rotates the optical disk at least once while the laser beam irradiation component moves from the first radial position to the second radial position at the second speed.

10. The optical disk manufacturing method according to claim 6, wherein:
the optical disk is rotated at least once by the rotation mechanism while the laser beam is moved by the movement mechanism from the first radial position to the second radial position at the second speed.

11. An optical disk manufacturing apparatus for manufacturing a phase-change optical disk having at least one recording layer including an identification information recording region for recording identification information of the optical disk, an inner peripheral region disposed on the inside in a radial direction of the identification information recording region, and an outer peripheral region disposed on the outside in the radial direction of the identification information recording region, said apparatus comprising:
a laser beam irradiation component that directs a laser beam at the at least one recording layer of the optical disk;
a movement mechanism that moves the laser beam irradiation component in a radial direction of the optical disk;
a rotation mechanism that rotates the optical disk; and
a controller that controls the laser beam irradiation component, the movement mechanism, and the rotation mechanism,
wherein, according to a command from the controller,
the laser beam irradiation component irradiates the recording layer with a laser beam at a first power level, required to crystallize the recording layer, while the rotation mechanism is rotating the optical disk;
the movement mechanism (i) changes a movement speed of the laser beam irradiation component from a first speed to a second speed at a first radial position located within a range where the laser beam irradiation component moves from the inner peripheral region of the optical disk to the identification information recording region, and (ii) changes the movement speed of the laser beam irradiation component from the second speed to a third speed at a second radial position at which the laser beam irradiation component has reached the identification information recording region at the second speed, the second speed is set to be lower than the first speed and the third speed, the laser beam irradiation component records the identification information by irradiating with a laser beam while alternating between the first power level and a second power level that is low enough not to crystallize the recording layer, when moving through the identification information recording region, and the movement mechanism changes the movement speed of the laser beam irradiation component from the second speed to the third speed before the laser beam irradiation component starts recording the identification information, and moves the laser beam irradiation component at the third speed while the laser beam irradiation component is recording the identification information.

12. The optical disk manufacturing apparatus according to claim 11, wherein:

at least one of the first radial position and the second speed is set so that the rotation mechanism rotates the optical disk at least once while the laser beam irradiation component moves from the first radial position to the second radial position at the second speed.

13. The optical disk manufacturing apparatus according to claim 11, wherein:

the optical disk has a plurality of recording layers, and the laser beam irradiation component records the identification information to a first recording layer out of all the plurality of recording layers, the first recording layer being located the farthest away from a laser beam irradiation side of the optical disk.

14. The optical disk manufacturing apparatus according to claim 11, wherein:

the controller:

irradiates an inner end of the inner peripheral region of the optical disk with a laser beam from the laser beam irradiation component at a third power level for focus pull-in, starts a focus servo after the focus pull-in, and starts irradiation of the inner peripheral region by the laser beam irradiation component with a laser beam at the first power level while operating the focus servo.

* * * * *